United States Patent [19]

Romer

[11] Patent Number: 4,929,929
[45] Date of Patent: May 29, 1990

[54] LEAKAGE CONTROL MECHANISM

[75] Inventor: Eike Romer, Seevetal, Fed. Rep. of Germany

[73] Assignee: Dipl.-Ing. Wrede & Niedecken Verwaltung GmbH, Fed. Rep. of Germany

[21] Appl. No.: 358,885

[22] Filed: May 30, 1989

[30] Foreign Application Priority Data

May 31, 1988 [DE] Fed. Rep. of Germany ....... 3818416

[51] Int. Cl.$^5$ .................... G08B 23/00; G01F 23/20
[52] U.S. Cl. ..................... 340/613; 73/296; 340/605
[58] Field of Search ........ 340/613, 616, 605; 73/296; 137/313

[56] References Cited

U.S. PATENT DOCUMENTS 1,163,491  12/1915  Weiss ................... 73/296 X

FOREIGN PATENT DOCUMENTS 2603522  8/1977  Fed. Rep. of Germany ...... 340/613

OTHER PUBLICATIONS

Kulak, J. E., et al., *Liquid Level Indication Apparatus*. In IBM Tech. Discl. Bull. vol. 9, No. 12, p. 1743, May 12, 1967.

*Primary Examiner*—Hezron E. Williams
*Assistant Examiner*—Joseph W. Roskos
*Attorney, Agent, or Firm*—John F. A. Earley; John F. A. Earley, III; P. Michael Walker

[57] ABSTRACT

A leakage control mechanism for aggregate (10) containing liquid and/or with liquid running through them has a receptacle (28) for liquid escaping from the aggregate (10), mounted elastically in vertical direction and equipped with a device (46, 66) for detecting the vertical position of the receptacle (28) and triggering a signal when a pre-set position of lowering is reached by the receptacle (28).

12 Claims, 2 Drawing Sheets

LEAKAGE CONTROL MECHANISM

DESCRIPTION

The invention refers to a leakage control mechanism for aggregates containing liquid or with liquid running through them.

Containers, some of which contain aggressive liquids such as acids or the like, are used in numerous technical fields. There are also numerous conveyor pipes for such liquids, particularly in the chemical and petrochemical industry. Also, the containers, especially the aforementioned pipelines, in rare instances can be developed as "closed" aggregates. However, it is much more common, in pipelines for example, to join individual pipelines together by means of corresponding flange connections or, in the case of containers, to provide them with intake and out flow installations.

Plainly, these points in particular, at which liquid can escape, are susceptible to leakage, i.e. leakiness.

To avoid such loss of liquid and, above all, possible environmental damage, there is an urgent need for appropriate sealing methods or leakage control means in industry.

While additional sealing measures can only be considered remedial measures, by means of which, in the end, liquid can only be temporarily kept from escaping, there is currently practically no effective leakage control mechanism available.

So, industry is currently widely limited to placing receptacles for escaping liquid at critical points, such as flange connections in pipelines, under the flange connections which must then be inspected visually. Such a measure can, however, only be considered temporary.

The basis of the invention is the problem of providing a leakage control mechanism for aggregates containing liquid and/or with liquid running through them, in which a self-acting, automatic control of any possibly escaping liquid can be guaranteed. The mechanism should preferably be designed so that it can be connected to aggregates of any shape and size and, most importantly, can be added subsequently to such aggregates.

For this, a control mechanism is proposed which, in its most general version, has a receptacle for liquid escaping from the aggregate, which is vertically flexibly mounted and is equipped with a device for detecting the vertical position of the receptacle and setting off a signal when the receptacle reaches a level of lowering which can be pre-determined.

The principle of the mechanism according to the invention is thus based on the liquid, in the event of a leakage, being transferred into a receptacle and the receptacle, because of its elastic mounting, lowering with increasing liquid reception, that is initially to a determined, pre-set value at which a signal is then set off, e.g. optically or accoustically, that indicates the corresponding lowering of the receptacle. It is obvious that the triggering of a signal of the mechanism (and of the reaching of a determined lowering of the receptacle at the same time) is influenced by various parameters. For one thing, the vertical path of the receptacle can be regulated by a corresponding selection of the elastic fastening elements. If, for example, the receptacle is suspended on springs, a possibility described in more detail below, springs of different stiffness can be used, thus allowing for different lowerings of the receptacle for a single amount of liquid in the receptacle. In this way, the leakage control mechanism can be regulated in such a way, for example, that the receptacle drops a certain amount only after receiving for example one liter of liquid or goes that far already after taking in a few milliliters.

The device for detecting the vertical level of the receptacle can even be arranged at different points so that it is set off either already after the receptacle drops by only one or two miillimeters, for example, or only after the receptacle drops by ten centimeters, for example (corresponding to different amounts of liquid held).

In so doing, it is of course also possible to arrange several of said devices "parallel" to one another in order, for example, to give off a warning signal via a first device (when the receptacle has dropped an initial, smaller distance) and to shut off further passage of the liquid through a pipeline, for example, via a second device that only responds when the receptacle has dropped another distance after collecting a large amount of liquid.

In this case, it is then just as feasible, by a corresponding signal, to cause any liquid remaining in the pipeline to flow off into an overflow receptacle after a corresponding valve on the pipeline is opened.

The receptacle is preferably arranged in a container in which the lid has an opening for the introduction of a feed-pipe for the leakage liquid.

The feed-pipe then runs directly from the point in the aggregate where there is danger of leakage towards the receptacle and the liquid then flows directly through the feed-pipe into the receptacle.

For example, it has been suggested then that a flange connection of a pipeline be capped on all sides in the flange area with the cap possessing an opening at its lowest point from out of which the feed-pipe passes into the receptacle.

But it is also possible, for example, to arrange a basin below a horizontally running pipeline (or to surround an inner pipe with liquid running through it with an outer pipe with a clearance), preferably with a slight slope with, on the bottom at certain intervals, opening from each of which a feed-pipe in turn extends to a corresponding leakage control mechanism. In this way, pipelines of nearly any length can be supervised over their entire distance.

Naturally the principle can also be used on diagonally or vertically running pipelines, in which case the aforementioned collecting basins are thus each arranged with a feed-pipe at angles or bends, for example.

There are a variety of versions possible for the elastic mounting of the receptacle.

In a particularly preferred version, the receptacle is elastically suspended and/or supported elastically from below. This preferably accomplished by means of corresponding springs, with the springs attached at one end to the upper edge of the receptacle and the other end of each one to the container lid. In place of springs, other elastic elements can just as well be used, such as cords of an elastomer material.

The spring mounting of the receptacle can also be accomplished, from the other way, so that the springs are incorporated as compression springs that are placed between the under side of the bottom of the receptacle and the bottom of the container. The principle is the same as with the elastic mounting.

To bring the device back to its initial position after a case of disorder, the receptacle should be removable, so that liquid in the receptacle can be easily removed.

There are also various alternative possibilities proposed for the described device for detecting the vertical position of the receptacle and triggering of a signal when the receptacle drops to a pre-set level.

A first version involves arranging a light barrier set below the bottom of the receptacle. The light barrier in this case consists of an emitter and a sensor arranged at a distance horizontally opposite the former, with emitter and sensor positioned just lateral to the verical path in which the receptacle moves. The final characteristic is thus important, so the receptacle can drop freely.

In the event of a disorder, liquid then drips or flows preferably through a corresponding feed-pipe into the receptacle which is continually lowered as the fill level increases due to the elastic mounting. When the receptacle sinks to a point where the light path of the light barrier is interrupted, this interruption of the light ray and thus a disorder are immediately indicated.

This occurs preferably by the light barrier being connected to a relay switch that is activated after the light ray emitted from the emitter of the light barrier is intercepted and sets off a signal. This signal can, in turn, be an acoustical or optical signal, but it can just as well be used directly to switch off a pump which transports liquid through the pipeline.

The activation of the light barrier can be influenced positively by placing a metal piece extending vertically downward under the bottom of the receptacle, aligned essentially perpendicular to the light path of the light barrier. This metal piece thus practically "cuts through" the light beam of the light barrier and thus makes an especially sensitive recording of a disorder possible.

In the receptacle, as described above, is arranged in a container, it is thus possible to arrange emitter and sensor of the light barrier at points opposite each other on the inner wall of the container. This version is not only particularly simple, but is also guarantees a high level of safety.

While the aforementioned installation is based on the principle of the interruption of a horizontal light beam, an alternative version of the signal device provides the arranging of a measuring device under the bottom of the receptacle to detect the vertical distance between a measuring cell of the measuring device and the bottom of the receptacle.

In this case, there is thus a measuring of distance between measuring device and receptacle. In so doing, the measuring device can then be set so that it responds after a corresponding shortenig of the distance from the receptacle to the measuring device (corresponding to an increased volume of liquid filling the receptacle).

If, for example, the distance between the measuring cell of the measuring device and the bottom of the receptacle is in the initial position "x", the measuring device can thus be set so that it responds as soon as the distance has decreased to the size "x" minus "y", where the value "y" can be set and thereby the response threshold of the measuring device.

Measuring devices of the aforementioned type are known as such in the state of the art, but can henceforth be used for a completely new purpose. The specialist can look for, among the measuring devices on the market, the one that is best suited to the particular application.

In so doing, a measuring device of the type that has an emitter emitting an electromagnetic ray along a path, while a sensor trained on the path and picking up the electromagnetic ray is provided on the underside of the bottom of the receptacle. At the same time, the measuring device should then be developed with a relay that is in electrical connection with the measuring device and is activated when a regulatable, pre-set distance value between emitter and sensor has been passed and sets off a signal corresponding to the signal of the above described installation.

The emitter in this example can be a photodiode (LED) and the sensor can be a phototransistor.

A photodiode, LED: light emitting diode is on the market, tuned to corresponding phototransistors. Normally photodiodes and phototransistors have relatively narrow coned transmitting and receiving angles, considerably reducing the interference factor from sweep radiation rays. A particularly high insensitivity to disturbances can be obtained by having the effective wave length range of emitter and sensor in infrared. In this way, the operating safety of the mechanism is further increased to a considerable degree on the whole.

The invention is furthermore not limited to the aforementioned measuring and signal devices, but rather any other devices with the same effect can also be used, for example a scale on which the receptacle sits and which is connected to a signal device that responds at a certain weight (filling level). To obtain even filling of the receptacle and thus its ability to slide absolutely vertically, it is furthermore suggested to complement the receptacle and/or the container with a cylindrical peripheral area. It is then even more advantageous to keep the diameter of the receptacle as small as possible.

Because of the described construction, there is no difficulty in producing the receptacle from such raw materials as are resistant to aggressive liquids. Examples of these are steel, glass, and ceramic among others.

In this way, one can make sure the mechanism is not destroyed in case of a leakage. Moreover, the mechanism can be used again with no problem immediately after a disorder, after the liquid in the collecting container has been disposed of.

It is obvious that the described leakage control mechanism has a great number of advantages. For one thing, it is of particularly simple construction and can thus be produced easily and inexpensively. Moreover, it can be hooked up to nearly any aggregate as described above. Above all, the system can easily be added to already existing installations without necessitating more extensive transformations. Finally, the mechanism itself is extremely unsusceptible to disorders and can be immediately used again after a disorder.

Further characteristics and advantages of the invention result from the remaining sub-claims as well as the other disclosure documents.

The invention is explained in more detail below using examples of two versions which are presented solely as examples and are by no means to limit the invention. The enclosed diagram also contains two illustrations in which two versions of the leakage control mechanism according to the invention are represented in extremely simplified form.

In the figures, parts with the same function are identified with the same reference numbers.

Figure 1:
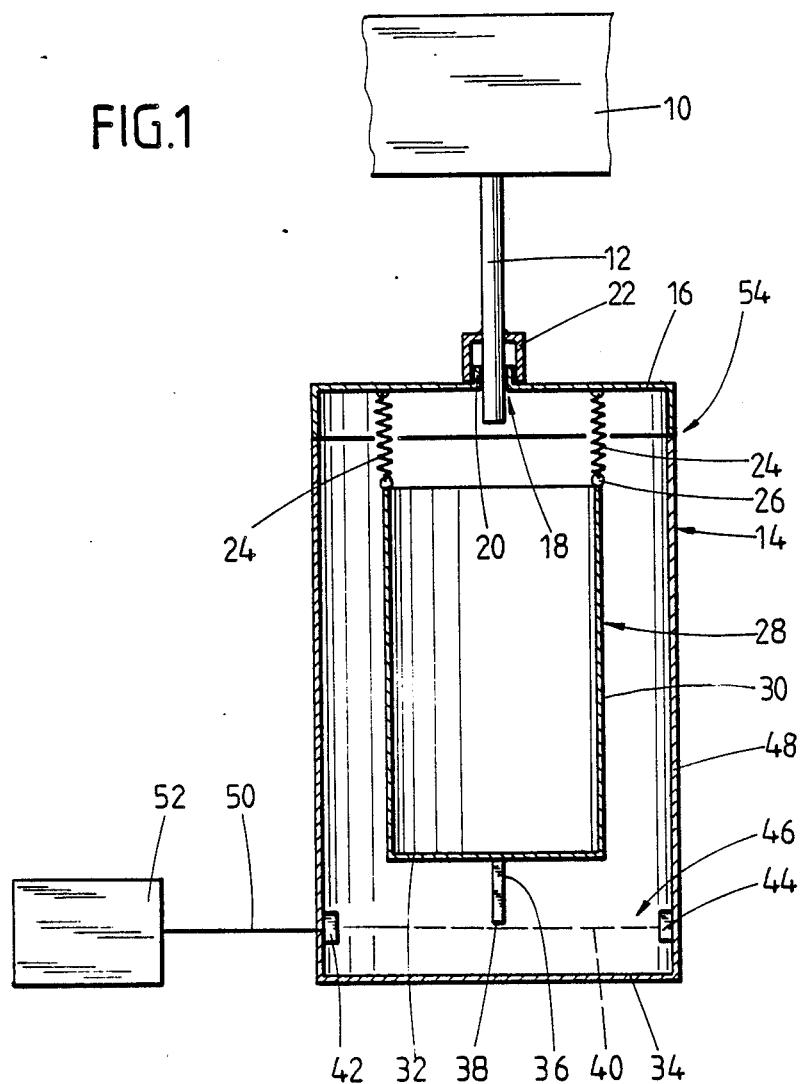
FIG. 1 shows a first version with a receptacle suspended by springs in a container and a horizontally operating light barrier arranged under the receptacle.

Reference number 10 shows a capsule that is arranged around a flange connection of a liquid conveying pipeline that is not shown individually. From the lower section of the cap 10 a feed-pipe 12 extends to a mechanism of a type according to the invention.

This mechanism consists of a steel container 14 are lid 16 of which has an opening 18 in the middle. Around the opening 18 in the middle, a ring-shaped flange 20 extends from the lid 16, with external threads that are not shown.

In the lower part, the feed-pipe 12 is complemented with a bowl-shaped part 22, that is open to the bottom and welded to the feed-pipe 12. The bowl-shaped part 22 has, inside on its free rim, internal threads that are also not shown.

The corresponding threads of the flange 20 and of the bowl-shaped part 22 are for screwing the container 14 onto the bowl-shaped part 22 and thereby attaching the container 14 to the feed-pipe 12.

As can be seen in the illustration, the feed-pipe 12 sticks through the opening 18 in the middle of the lid.

Various springs 24 run from the underside of the lid, and two of them 24 are shown in the illustration. The lower end of each of the springs 24 is attached to corresponding sections of the upper rim 26 of a collecting container.

The collecting container 28, which has a cylindrical peripheral area 30 and a round bottom 32, extends to inside the container 14 and ends at a distance from the bottom 34 of the container 14.

From the underside of the bottom 32, a metal piece 36 extends vertically downwards, with the metal piece 36 running perpendicular to the diagram plane.

In the initial position, the lower edge 38 of the metal piece 36 is situated somewhat above a light path 40 represented by a dotted line.

The light path 40 goes between the light projecting emitter 42 and the sensor 44 of a light barrier shown completely with reference number 46.

As can be seen in the illustration, the emitter 42 and the sensor 44 of the light barrier are attached to the inner wall of the container 48.

A connecting line 50 runs from the light barrier to a relay 52.

The operating method of the assembly is as follows.

In normal operation, i.e. when liquid is flowing through the pipeline (not shown), the collecting container 28 is in the position shown in the illustration and the light barrier 46 functions normally, i.e. the light beam projected from the emitter 42 runs straight to the sensor 44, without interruption.

If a disorder (leakage) then occurs in the area of the flange connection of the pipeline, a certain amount of liquid flows out that is caught by the capsule 10 and is disposed via the feed-pipe 12 into the collecting container 28. Depending on sensitivity (stiffness) of the springs 24, the quantity of liquid collected by the container 28 immediately, or with a certain delay, causes a lowering of the collecting container 28 by corresponding deflection of the springs 24. In this way, the metal piece 36 is accordingly also lowered. Precisely when the metal piece 36 cuts through the light path 40, the beam projected by the emitter 42 is no longer picked up by the sensor 44 thus causing the relay 52 to respond by giving off an electric, acoustical and/or optical signal at this instant. While the acoustical and/or optical signal is for drawing the attention of surveillance personnel to a disorder, the pump through which the liquid is transported through the pipeline can be shut off immediately by a corresponding electrical signal. The surveillance personnel then knows that there is a leakage at the place where the control mechanism is arranged and can take corresponding measures for eliminating the disorder.

When the disorder has been eliminated, for example the flange seal inside the capsule 10 has been repaired, the collecting container 28 is taken out of the container 14, the liquid in the collecting container 28 is disposed of an the collecting container 28 is then placed back in the container 14 in the manner shown in the illustration. For this purpose, the lower part of the container 14, which is attached at 54 to the upper part of the container by suitable (not shown) clamps, can be removed.

The version according to FIG. 2 differs from the version according to FIG. 1 in the following points:

The container lid 16, with its flange 20 (with internal threads), is screwed directly onto the feed-pipe 12 which has external threads for this purpose.

The lower part 56 of the container has a somewhat smaller diameter than the container lid 16 which overlaps the former somewhat. The container lid 16 and the lower part of the container 56 are detachably connected to one another by corresponding screw connections 58.

The lower part of the container 56 has an additional upper covering 59 which also has an opening 60 in the middle for introduction of the feed-pipe 12.

Figure 2:
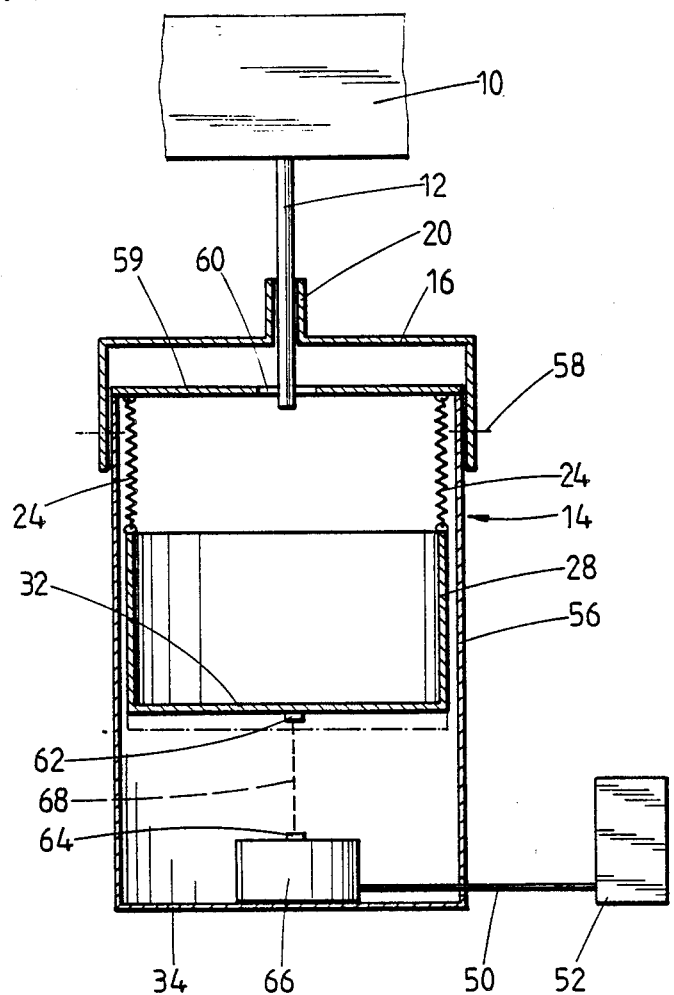
FIG. 2 shows a somewhat transformed version in which a vertically effective measuring device is arranged under the collecting container for determining the distance to the receptacle.

The receptacle container 28 is furthermore suspended in the same way as in the version according to FIG. 1, but with the springs 24 attached to the upper covering 59 and not to the lid 16. The round bottom 32 of the receptacle 28 in this example has no metal piece 36; rather a sensor 62 is arranged in the middle on its underside that functions in combination with an emitter 64 that is arranged in a measuring device 66 located at the bottom 34 of the container 14.

In this case the emitter 64 and the sensor 62 are vertically aligned with one another.

A connecting line 50 again runs from the measuring device 66 to a relay 52.

The measuring device 66 is for determining the distance (the space) between the emitter 64 and the sensor 62 and, for this, an electromagnetic beam is projected by the emitter along the path 68 (dotted line), to be picked up by the sensor 62. From the transist time of the electromagnetic waves, the distance betweeen the emitter 64 and the sensor 62 can be determined with extreme precision.

The measuring device 66 is thus set so that it continuously indicates the path length 68 and a signal is emitted by the relay 52 in the instant the path 68 shortens to the distance (x minus y) (at this instant, the bottom 32 of the receptacle 48 is in the position denoted by dot-dash line). The collecting container 28 is accordingly filled with a certain quantity of liquid at this point in time (disorder).

Furthermore, the principle corresponds to the measuring and signal mechanism according to the version in FIG. 1.

Tests have shown that the leakage control mechanism can be set so that a signal is given even before the receptacle 28 is filled with about 5 to 20 milliliters of liquid, i.e. even the slightest leakage and escape of liquid will be indicated.

The system according to the invention is thereby sufficient for the highest safety requirements. Disorders can be indicated immediately and more serious damage can be safely avoided by initiating appropriate countermeasures.

To avoid indication errors due to vibrations of the mechanism, for example, the relay 52 can be complemented by a corresponding time-lag element so that the relay 52 only gives off the described signal, for example, when the recorded position of the receptacle 28 is maintained for several seconds or the receptacle 28 is lowered further.

To keep the mechanism operational also during winter use, it is advantageous to have the feed-pipe 12, the container 14 and/or the receptacle 48 heated. In this way, one can be sure that liquid escaping in a leakage and caught in the receptacle 28 will not freeze.

I claim:

1. Leakage control mechanism for aggregates (10) containing liquid and/or with liquid running through them, with a receptacle (28) for liquid escaping from the aggregate (10), mounted elastically, in vertical direction and equipped with a device (46, 66) for detecting the vertical position of the receptacle (28) and triggering a signal when a pre-set position of lowering is reached by the receptacle (28), in which the receptacle (28) is arranged in a container (14) the lid (16) of which has an opening (18, 60) for inserting a feed-pipe (12) for the leakage liquid.

2. Leakage control mechanism for aggregates (10) containing liquid and/or with liquid running through them, with a receptacle (28) for liquid escaping from the aggregate (10), mounted elastically in vertical direction and equipped with a device (46, 66) for detecting the vertical position of the receptacle (28) and triggering a signal when a pre-set position of lowering is reached by the receptacle (28), in which a light barrier (46) under the bottom (32) of the receptacle (28) is provided with an emitter (42) and a sensor (44) arranged horizontally across from it at a distance, with emitter (42) and sensor (44) positioned laterally next to the vertical path moved along by the receptacle (28).

3. Control mechanism according to claim 2 in which the light barrier (46) is connected to a relay switch (52) which is activated after the light beam projected by the emitter (42) of the light barrier (46) is crossed and sets off a signal.

4. Control mechanism according to claim 3 in which the relay switch (52) is complemented with a time-delay element.

5. Control mechanism according to claim 2 in which a metal piece (36) extends vertically downward from the bottom (32) of the receptacle (28) and essentially runs perpendicular to the light path (40) of the light barrier.

6. Control mechanism according to claim 2 in which the emitter (42) and sensor (44) of the light barrier (46) are arranged at points opposite each other on the inside wall of the container (14).

7. Leakage control mechanism for aggregates (10) containing liquid and/or with liquid running through them, with a receptacle (28) for liquid escaping from the aggregate (10), mounted elastically in vertical direction and equipped with a device (46, 66) for detecting the vertical position of the receptacle (28) and triggering a signal when a pre-set position of lowering is reached by the receptacle (28), in which a measuring device (66) for detecting the vertical distance (68) between an emitter (64) of the measuring device (66) and a sensor (62) arranged at the bottom (32) of the receptacle (28) is provided.

8. Control mechanism according to claim 7 in which the measuring device (66) has an emitter (64) sending out electromagnetic rays along a path and, on the underside (32) of the receptacle (28), a sensor (62) is provided that is trained on the path (68) and picks up the electromagnetic rays and the measuring device (66) is in electrical contact with a switch relay (52) that is activated when a regulatable, pre-set distance (68) between emitter (64) and sensor (62) becomes shorter and then sets off a signal.

9. Control mechanism according to claim 8 in which the emitter (64) is a photodiode (LED) and the sensor (62) is a phototransistor.

10. Control mechanism according to claim 7 in which the receptacle (28) is arranged in a container (14) and in which the measuring device (66) is arranged on the bottom (34) of the container (14), preferably in its center.

11. Leakage control mechanism for aggregates (10) containing liquid and/or with liquid running through them, with a receptacle (28) for liquid escaping from the aggregate (10), mounted elastically in vertical direction and equipped with a device (46, 66) for detecting the vertical position of the receptacle (28) and triggering a signal when a pre-set position of lowering is reached by the receptacle (28), in which the receptacle (28) is arranged in a container (14) the lid (16) of which has an opening (18, 60) for inserting a feed-pipe (12) for the leakage liquid, in which the receptacle (28) is elastically suspended and/or supported elastically from below, in which the receptacle (28) is suspended on springs and/or supported on springs, in which the springs (24) are each attached with one end to the receptacle (28) and with the other end to the container (14), in which the receptacle (28) is removably arranged, in which a light barrier (46) under the bottom (32) of the receptacle (28) is provided with an emitter (42) and a sensor (44) arranged horizontally across from it at a distance, with emitter (42) and sensor (44) positioned laterally next to the vertical path moved along by the receptacle (28), in which the light barrier (46) is connected to a relay switch (52) which is activated after the light beam projected by the emitter (42) of the light barrier (46) is crossed and sets off a signal, in which a metal piece (36) extends vertically downward from the bottom (32) of the receptacle (28) and essentially runs perpendicular to the light path (40) of the light barrier, in which the emitter (42) and sensor (44) of the light barrier (46) are arranged at points opposite each other on the inside wall of the container, in which the relay switch (52) is complemented with a time-delay element, in which the receptacle (28) and/or the container (14) has a cylindrical peripheral area, in which at least the receptacle (28) consists of a raw material that is resistant to aggressive liquids, in particular steel, glass or ceramic, in which the feed-pipe (12), the container (14) and/or the receptacle (28) is (are) heated.

12. Leakage control mechanism for aggregates (10) containing liquid and/or with liquid running through them, with a receptacle (28) for liquid escaping from the aggregate (10), mounted elastically in vertical direction and equipped with a device (46, 66) for detecting the vertical position of the receptacle (28) and triggering a signal when a pre-set position of lowering is reached by the receptacle (28), in which the receptacle (28) is arranged in a container (14) the lid (16) of which has an opening (18, 60) for inserting a feed-pipe (12) for the leakage liquid, in which the receptacle (28) is elastically suspended and/or supported elastically from below, in which the receptacle (28) is suspended on springs and/or supported on springs, in which the springs (24) are each attached with one end to the receptacle (28) and with the other end to the container (14), in which the receptacle (28) is removably arranged, in which a measuring device (66) for detecting the vertical distance (68) between an emitter (64) of the measuring device (66) and a sensor (62) arranged at the bottom (32) of the receptacle (28) is provided, in which the measuring device (66) has an emitter (64) sending out electromagnetic rays along a path and, on the underside (32) of the receptacle (28), a sensor (62) is provided that is trained on the path (68) and picks up the electromagnetic rays and the measuring device (66) is in electrical contact with a switch relay (52) that is activated when a regulatable, pre-set distance (68) between emitter (64) and sensor (62) becomes shorter and then sets off a signal, in which the emitter (64) is a photodiode (LED) and the sensor (62) is a phototransistor, in which the measuring device (66) is arranged on the bottom (34) of the container (14), preferably in its center.

* * * * *